United States Patent
DiStefano et al.

(10) Patent No.: US 8,380,975 B2
(45) Date of Patent: Feb. 19, 2013

(54) SAFETY DATA WRITES

(75) Inventors: John R. DiStefano, Mickleton, NJ (US); David J. Marks, Trappe, PA (US); John P. Klapper, Doylestown, PA (US); John C. Yozallinas, Hatboro, PA (US); Robert Q. James, Lansdale, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 858 days.

(21) Appl. No.: 11/761,542

(22) Filed: Jun. 12, 2007

(65) Prior Publication Data

US 2008/0005552 A1    Jan. 3, 2008

Related U.S. Application Data

(60) Provisional application No. 60/813,249, filed on Jun. 13, 2006.

(51) Int. Cl.
*G06F 1/24* (2006.01)
(52) U.S. Cl. ................. 713/100; 713/1; 713/2
(58) Field of Classification Search ............ 713/1, 2, 713/100; 700/79
See application file for complete search history.

(56) References Cited

U.S. PATENT DOCUMENTS

| | | | |
|---|---|---|---|
| 6,175,929 B1* | 1/2001 | Hsu et al. | 713/500 |
| 6,511,412 B1* | 1/2003 | Freed et al. | 600/17 |
| 6,725,104 B2* | 4/2004 | Lo et al. | 700/65 |
| 7,084,410 B2* | 8/2006 | Beloussov et al. | 250/492.1 |
| 7,281,056 B1* | 10/2007 | Nolan et al. | 709/232 |
| 2004/0122550 A1* | 6/2004 | Klimko et al. | 700/212 |
| 2004/0193287 A1 | 9/2004 | Lefebvre | |
| 2005/0033385 A1* | 2/2005 | Peterson et al. | 607/60 |
| 2005/0097194 A1* | 5/2005 | Eisenbeis et al. | 709/221 |
| 2007/0123249 A1* | 5/2007 | Sun | 455/423 |
| 2008/0155323 A1* | 6/2008 | Hogan et al. | 714/22 |

FOREIGN PATENT DOCUMENTS

| | | |
|---|---|---|
| DE | 10252277 A1 | 5/2004 |
| GB | 2341524 A | 3/2000 |
| GB | 2420431 A | 5/2006 |
| WO | WO 03029907 A1 | 4/2003 |

OTHER PUBLICATIONS

EP Search Report dated Jul. 5, 2012 for Application No. 12169550. 6-2206.

* cited by examiner

*Primary Examiner* — Paul Yanchus, III

(57) ABSTRACT

Systems and methods for safety data writes for process control networks are disclosed. The system may load changed parameters into a function block implemented by a process control server. The loaded changed parameters may be verified as being within safe limits and correctly entered. The verified changed parameters may be loaded into the field device controllers and the system restarted using the loaded changed parameters. The system may load parameters with an online system and use the loaded changed parameters during a warm restart.

20 Claims, 4 Drawing Sheets

Initiate control process
302

↓

Prevent transmission of the startup parameters to the field device controller
304

↓

Diagnose reason startup parameters were not transmitted to field device controller
306

↓

Communicate to the operator a diagnosis
308

↓

Complete control process
310

SAFETY DATA WRITES

CROSS REFERENCE TO RELATED APPLICATIONS

This application claims priority to U.S. Provisional Patent Application No. 60/813,249 filed Jun. 13, 2006 entitled "Safety Data Writes for S7F Systems", which is incorporated fully herein by reference.

FIELD OF THE INVENTION

The present invention relates generally to process control systems, and more particularly to load data associated with starting or restarting a process control system.

BACKGROUND OF THE INVENTION

In the process automation industry, object linking and embedding for process control (OPC) provides a standard for communicating with field devices. This standard allows for accessing process data, alarms, events, and historical process data. In a typical monitoring and control network, one or more servers are equipped with the OPC Server application which receives field device data and stores the data in volatile memory.

Function Blocks implemented in the field device controller, control the operation of the field devices and overall system, for example, data is constantly being updated through polling functions initiated by the process control server. A client computer is typically equipped with a Human Machine Interface (HMI) application that is used to visualize and interact with the field devices using symbolic images and standard windows widgets (e.g. listbox, textbox, radio button, checkbox). The HMI contains programs/drivers capable of communicating through function blocks with any process control server accessible locally on the same computer or from the network.

Parameters used to regulate the process control system may need to be altered for specific conditions that may require human observation. However, changes to these parameters may have detrimental effects if the entered parameters are outside acceptable ranges or not carefully considered. Accordingly, an efficient device, system and method are needed for allowing parameters to be altered safely without error by one or more operators. In addition, a device, system and method may need to provide for using restart parameters during warm start or testing other than setting back to the safety cold start parameters.

SUMMARY OF THE INVENTION

It is, therefore, an object of the present invention to provide systems and methods for safety data writes for process control data. The system may load parameters into a function block implemented by a process control server. The loaded parameters may be verified as being within safe limits and correctly entered. The verified parameters may be loaded into the field device controllers and the system restarted using the loaded parameters.

Embodiments of the invention may include one or more of the following features. In one embodiment, the system receives a read back of the changed parameters loaded into the function block. The system acknowledges the changed parameters loaded into the function block by an operator and transmits the changed parameters to field device controller. In another embodiment, the system may prevent transmission of the changed parameters to field device controller. The system diagnoses the reasons or symptoms for why the changed parameters were not transmitted and communicates the diagnoses to the operator. In yet another embodiment, the system reloads the changed parameters in the field device controllers and restarts a warm process control system using the loaded changed parameters.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 3 is a flow chart illustrating a second exemplary embodiment of the present invention.

DETAILED DESCRIPTION OF THE INVENTION

Figure 1:
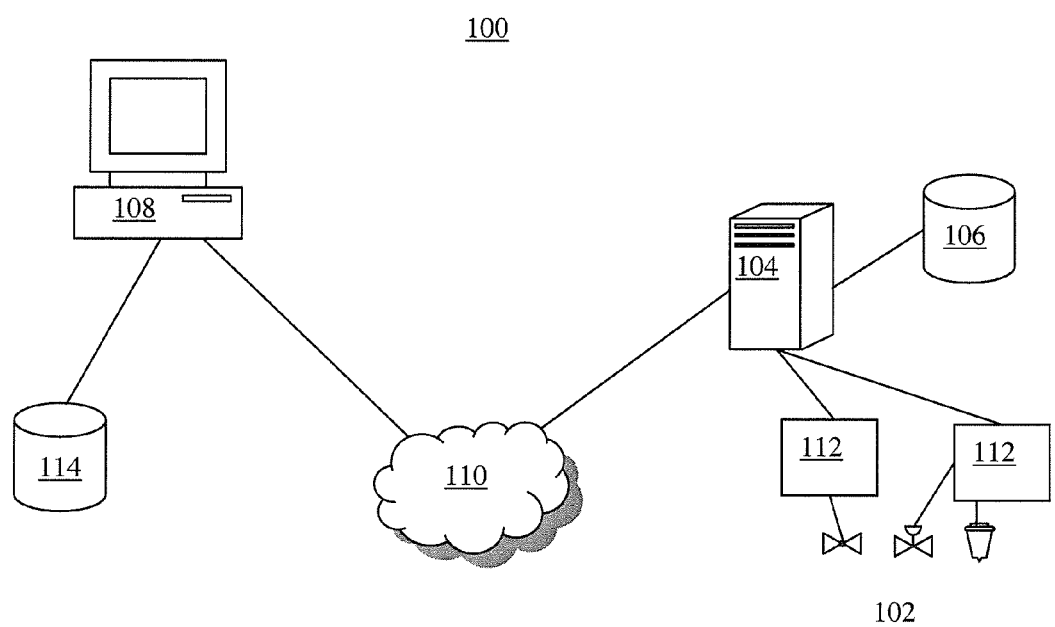
FIG. 1 is a generalized schematic of a first exemplary embodiment of the present invention.

Referring to FIG. 1, an exemplary safety data writes system 100 is shown. This type of design is frequently used in the process automation industry. One or more input/output (I/O) devices and/or field devices 102 may be used to measure or calculate various parameters related to a process. The I/Os and field devices 102 may be connected to a process control server 104. The system 100 may be, for example, a Simatic S7 manufactured by Siemens Automation. The process control server 104 may be equipped with the object linking and embedding for process control (OPC) server application which collects field device data and stores the data in volatile memory. This data is continuously being updated through polling functions initiated by the process control server 104 or by a predetermined reporting cycle that the I/Os and field devices 102 follow to report the status of the I/Os and field devices 102. The addressing information needed to access the I/Os and field devices 102 is stored in a server's tag database 106.

The server's database 106 stores function blocks data that are accessible by any client computer 108 with access through a network 110 connected to the process control server 104. The network 110 may connect to one process control server 104 (as shown in FIG. 1) or it may connect to multiple servers. Multiple servers may be used to control separate processes either at the same location or at various separate locations. The network 110 may allow access to any of its connected servers. There may also be more than one client computer 108 connected to the network 110.

An exemplary process control server 104 may control each field device through a field device controller 112. The field device controller may be a Programmable Logic Controller (PLC) or other controller. The field device controller may be specific and/or internal to the field device 102 or may be separate and used to operate multiple field devices 102. The field device controllers 112 may use propriety protocol and connections specific to the controller. Function Blocks processed in the field device controllers 112 may be used to communicate operating parameters to process control server 104.

In an exemplary embodiment of the safety data writes system, the client computer 108 may be equipped with a Human Machine Interface (HMI) application 114. The HMI application 114 may be used to visualize and interact with the field devices 102 using symbolic images and standard windows widgets (e.g. listbox, textbox, radio button, checkbox). The HMI application 114 may contain programs/drivers capable of communicating with any process control server 104 accessible locally on the same computer or from the network 110.

Figure 2:
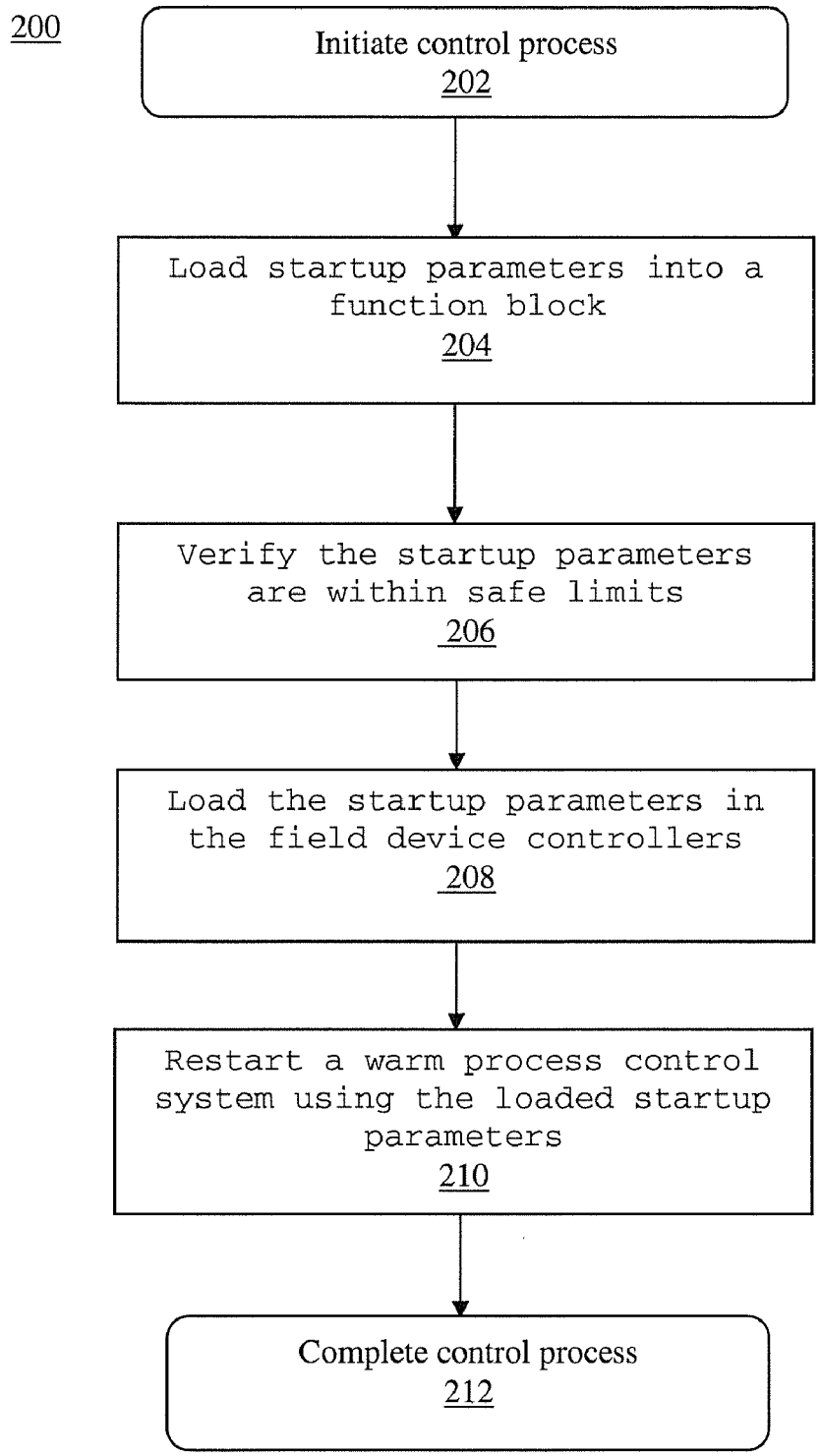
FIG. 2 is a flow chart illustrating a first exemplary embodiment of the present invention.

Referring to FIG. 2, a flowchart illustrates a first exemplary method for safety data writes for process control system 200. The control process is initiated (block 202). The initiation may be by operator through the HMI application 114 or a software triggered action. The process control server 104 writes changed parameters into a function block (block 204). The parameters may be entered by the operator through the HMI application 114. The process control server 104 may store the parameters with or linked to the function blocks. The parameters are verified to be within safe limits (block 206). The verification may be by displaying the parameters again via the HMI application 114 and/or automated verification of predetermined values stored in the server's database 106. The changed parameters may be then be consumed by other function blocks in the field device controllers 112 (block 208). The process control system 100 may be restarted using the loaded changed parameters instead of cold startup parameters (block 210). The control process is completed and may be reinitiated by the operator or software (block 212). The field device controller 112 may default to the startup parameters within the function block for future restarts. The parameters may include variables that may be updated by specified action of the process control network. For example, a counter may be used to limit the number of restarts using parameters of the functions blocks.

Referring to FIG. 3, a flowchart illustrates a second exemplary method for safety data writes for process control system 300. The control process is initiated (block 302). The changed parameters are prevented from being transmitted to the field device controller (block 304). This may be accomplished by not processing the function block by the process control server 104 or a variety of the other possible reasons, for example, but not limited to, not being able to communicate with the field device controller 112, or another function block identifying the changed parameters as being outside of safety limits or unauthorized operator and preventing the transmission of parameters. The process control server 104 may diagnose the reasons or symptoms for the startup parameters not transmitted to field device controller 112 (block 306). The diagnosis is communicated to the operator via the HMI application 114 and/or stored in the server's database 106 (block 308). The control process is completed and may be reinitiated by the operator or software (block 310).

Figure 4:
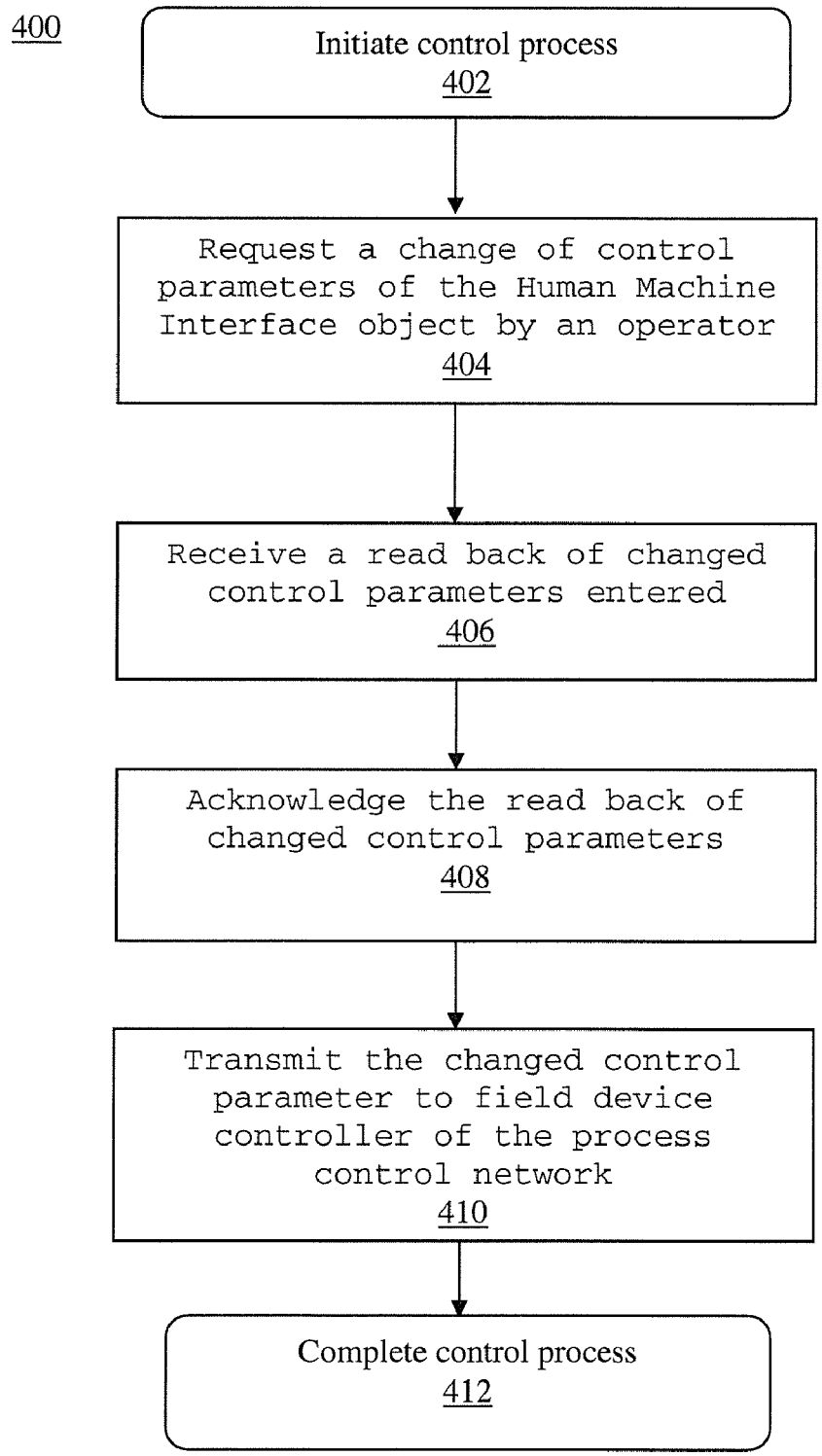
FIG. 4 is a flow chart illustrating a third exemplary embodiment of the present invention.

Referring to FIG. 4, a flowchart illustrates a third exemplary method for safety data writes for process control system 400. The control process is initiated (block 402). The initiation may be by operator through the HMI application 114 or a software triggered action. The operator requests a change of control parameters of the Human Machine Interface object by HMI application 114 (block 404). HMI displays a read back of changed control parameters entered (block 406). The process control server 104 may have already loaded the changed parameters into a function block or may hold them in storage by the HMI application 114 or the process control server 104. The operator via the HMI or automated application acknowledges the change of control parameters (block 408). The verified changed parameters are transmitted to the field device controller 112 of the process control network (block 410). The process control system 100 may be restarted using the loaded changed parameters instead of cold startup parameters. The control process is completed and may be reinitiated by the operator or software (block 212).

It will be understood that the foregoing is only illustrative of the principles of the invention and that various modifications can be made by those skilled in the art without departing from the scope and spirit of the invention. Accordingly, such embodiments will be recognized as within the scope of the present invention. Persons skilled in the art will also appreciate that the present invention can be practiced by other than the described embodiments, which are presented for purposes of illustration rather than of limitation and that the present invention is limited only by the claims that follow.

What is claimed is:

1. A method for safe and secure communication of a process control network comprising the steps of:
   loading changed parameters associated with a field device controller into a function block implemented by a process control server;
   verifying that the changed parameters loaded into the function block are within safe limits for operation of a field device associated with the field device controller;
   loading the changed parameters into the field device controller in response to said verifying step;
   restarting a warm process control system using the loaded changed parameters instead of cold startup parameters without changing the cold startup parameters; and
   updating a counter representing a number of restarts of the warm process control system using the loaded changed parameters.

2. The method of claim 1 wherein the changed parameters are entered by an operator entering control parameters for a human machine interface object.

3. The method of claim 1 further comprising the acts of:
   receiving a read back of the changed parameters loaded into the function block;
   acknowledging the changed parameters loaded into the function block by an operator;
   transmitting the changed parameters to the field device controller.

4. The method of claim 1 further comprising the acts of:
   verifying that the changed parameters loaded into the function block are within predetermined safety limits.

5. The method of claim 1 further comprising the acts of:
   preventing transmission of the changed parameters to the field device controller;
   diagnosing a reason changed parameters were not transmitted to the field device controller; and
   communicating to the operator a diagnosis from the act of diagnosing.

6. The method of claim 1 wherein the field controller device is a Programmable Logic Controller.

7. The method of claim 1 comprising the steps of:
   shutting down the process control system;
   reloading the changed parameters into the field device controller; and
   restarting a warm process control system using the loaded changed parameters.

8. A method for safe and secure communication of a process control network comprising the steps of:
- requesting a change of control parameters associated with a field device controller through a Human Machine Interface object by an operator;
- receiving a read back of changed control parameters entered;
- acknowledging the read back of changed control parameters indicating that the changed parameters are within safe limits for operation of a field device associated with the field device controller;
- transmitting the changed control parameters to the field device controller of the process control network in response to said acknowledging step to restart a warm process of the field device controller using the changed control parameters instead of cold startup parameters without changing the cold startup parameters; and
- updating a counter representing a number of restarts of the warm process control system using the loaded changed parameters.

9. The method of claim 8 wherein the changed parameters are entered by an operator entering control parameters for the Human Machine Interface object.

10. The method of claim 8 further comprising the steps of:
- verifying that the changed parameters loaded into the function block are within predetermined safety limits.

11. The method of claim 8 further comprising the steps of:
- preventing transmission of the changed parameters to the field device controller;
- diagnosing a reason changed parameters were not transmitted to a field device controller; and
- communicating to the operator a diagnosis from the step of diagnosing.

12. The method of claim 8 wherein the field controller device is a Programmable Logic Controller.

13. The method of claim 8 further comprising the steps of:
- shutting down the process control system;
- reloading the changed parameters in the field device controller; and
- restarting a warm process control system using the loaded changed parameters.

14. The method of claim 8 further comprising the steps of:
- verifying a unique identifier associated with an operator of the Human Machine Interface prior to the action of transmitting the changed control parameter.

15. A safety data writing system for a process control network comprising:
- one or more field device controllers; and
- a process control server loading startup parameters associated with a field device controller into a function block implemented by a process control server; verifying that the changed parameters loaded into the function block are within safe limits for operation of a field device associated with the field device controller; loading the changed parameters into the field device controller in response to said verification; restarting a warm process control system using the loaded changed parameters instead of cold startup parameters without changing the cold startup parameters; and updating a counter representing a number of restarts of the warm process control system using the loaded changed parameters.

16. A safety data system of claim 15 further comprising:
- a client computer acknowledging the changed parameters loaded into the function block by an operator wherein the process control server receives a read back of the changed parameters loaded into the function block and transmits the changed parameters to the field device controller.

17. A safety data writing system of claim 15 wherein the process control server verifies that the changed parameters loaded into the function block are within predetermined safety limits.

18. A safety data writing system of claim 15 wherein the process control server prevents transmission of the changed parameters to the field device controller; diagnoses a reason changed parameters were not transmitted to the field device controller; and communicates to the operator a diagnosis.

19. A safety data writing system of claim 15 wherein the field device controller is a Programmable Logic Controller.

20. A safety data writing system of claim 15 wherein the process control server verifies a unique identifier associated with an operator of a human machine interface prior to transmitting the changed control parameter to the field controller device.

* * * * *